United States Patent
Chan et al.

(10) Patent No.: US 10,086,322 B2
(45) Date of Patent: Oct. 2, 2018

(54) INTELLIGENT CONTROL METHOD FOR AIR CONDITION DEVICE

(71) Applicant: DELTA ELECTRONICS, INC., Taoyuan County (TW)

(72) Inventors: Ping-Chieh Chan, Taoyuan County (TW); Hua-Yi Hsieh, Taoyuan County (TW); Cheng-Yi Huang, Taoyuan County (TW); Yuan-Ping Hsieh, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 377 days.

(21) Appl. No.: 14/826,414

(22) Filed: Aug. 14, 2015

(65) Prior Publication Data
US 2016/0048143 A1  Feb. 18, 2016

Related U.S. Application Data

(60) Provisional application No. 62/038,076, filed on Aug. 15, 2014.

(51) Int. Cl.
*B01D 46/00* (2006.01)
*H04B 7/24* (2006.01)
(Continued)

(52) U.S. Cl.
CPC ........ *B01D 46/0086* (2013.01); *F24F 3/1603* (2013.01); *F24F 11/30* (2018.01);
(Continued)

(58) Field of Classification Search
CPC . B01D 46/0086; F24F 3/1603; F24F 11/0012; F24F 11/0015; F24F 11/0034;
(Continued)

(56) References Cited

U.S. PATENT DOCUMENTS

| 8,350,697 B2 * | 1/2013 | Trundle | F24F 11/0086 340/539.26 |
| 2006/0184283 A1 * | 8/2006 | Lee | F24F 11/0017 700/276 |

(Continued)

OTHER PUBLICATIONS

Machine translation of JP2013-120001, Mizutaka Atsushi, Device and Method of Changing Set Value for CO2 Concentration Control, Jun. 17, 2013, 6 pages.*

(Continued)

*Primary Examiner* — Thomas C Lee
*Assistant Examiner* — Tri T Nguyen
(74) *Attorney, Agent, or Firm* — Hauptman Ham, LLP

(57) ABSTRACT

An intelligent control method used in an intelligent control system includes an intelligent control device and an air condition device. The intelligent control device records $CO_2$ amount value in an area continuously after the air condition device is started, and calculates a $CO_2$ reference value based on the recorded $CO_2$ amount value after a luminaire device in the area is turned off. Then, the intelligent control device records the $CO_2$ amount value for a time period and calculates a $CO_2$ compared value after the time period passes. The intelligent control device determines whether the $CO_2$ amount value trend is varied upwardly or downwardly for choosing among keeping the current state, switching the operating mode of the air condition device or turning off the air condition device.

19 Claims, 11 Drawing Sheets

(51) Int. Cl.
    *F24F 11/30*     (2018.01)
    *F24F 11/79*     (2018.01)
    *F24F 11/62*     (2018.01)
    *F24F 11/39*     (2018.01)
    *G05B 19/042*     (2006.01)
    *G05B 19/048*     (2006.01)
    *G05D 23/19*     (2006.01)
    *H04L 12/28*     (2006.01)
    *F24F 3/16*     (2006.01)
    *F24F 120/10*     (2018.01)
    *F24F 110/40*     (2018.01)

(52) U.S. Cl.
CPC .............. *F24F 11/39* (2018.01); *F24F 11/62* (2018.01); *F24F 11/79* (2018.01); *G05B 19/042* (2013.01); *G05B 19/048* (2013.01); *G05B 19/0428* (2013.01); *G05D 23/1919* (2013.01); *H04B 7/24* (2013.01); *H04L 12/2827* (2013.01); *F24F 2110/40* (2018.01); *F24F 2120/10* (2018.01); *G05B 2219/2614* (2013.01); *Y02D 70/00* (2018.01); *Y02D 70/142* (2018.01); *Y02D 70/144* (2018.01); *Y02D 70/162* (2018.01); *Y02D 70/166* (2018.01); *Y02D 70/26* (2018.01); *Y02D 70/448* (2018.01); *Y02P 90/84* (2015.11)

(58) Field of Classification Search
CPC .. F24F 11/006; F24F 11/0078; F24F 11/0086; F24F 2011/0042; G05B 19/042; G05B 19/0428; G05B 19/048; G05D 23/1919; H04B 7/24; H04L 12/2827; Y02P 90/84
See application file for complete search history.

(56) References Cited

U.S. PATENT DOCUMENTS

2010/0025483 A1*   2/2010   Hoeynck ................ F24F 11/001
                                                                           236/1 C
2013/0181617 A1*   7/2013   Maddox ............ H05B 37/0227
                                                                           315/159

OTHER PUBLICATIONS

Machine translation of CN101363796, Guang Jun Zhang et al., Carbon dioxide analyzer and analytical method thereof, Feb. 11, 2009, 8 pages.*

Machine translation of JP2007-107782, Azumi Jun, Air Conditioning Control System and Air Conditioning Control Device, Apr. 26, 2007, 37 pages.*

* cited by examiner

INTELLIGENT CONTROL METHOD FOR AIR CONDITION DEVICE

TECHNICAL FIELD

The present invention relates to a control method for an air condition device and more particularly related to an intelligent control method for an air condition device.

BACKGROUND

To efficiently control air condition devices in an area, there are various intelligent air condition systems in the market. Most current intelligent air condition systems mainly include an air condition equipment and a sensor for detecting temperature and humidity in an area. By such, the air condition equipment may automatically operate according to temperature and humidity values detected by the sensor. For example, if the temperature value is too high, the air condition equipment enters a cool mode. If the temperature is too low, the air condition equipment enters a heating mode. If the humidity value is too high, the air condition equipment enters a dry mode.

There is usually a control device designed for such intelligent air condition systems for providing control to the air condition equipment. The control device is usually disposed in the same area of the air condition equipment and the sensor and has simple operation and control functions. Specifically, the control device may depend on simple information, i.e. sensed temperature and humidity, to generate a corresponding control command and control the air condition device to turn on, turn off or switch operation modes according to the control command. Because the generated parameters of the control command are too simple, the air condition equipment may fail to satisfy the needs of users.

In addition, in addition to control the air condition equipment according to the control command, current control devices usually do not have additional functions and that is not intelligent enough.

In addition, some intelligent air condition systems further has a light sensor or is directly connected to an luminaire device in the area. By such, when users enter the area and turn on the luminaire device, the air condition device may be activated automatically to provide users with a more comfortable environment. On the other hand, when users leave the area and turn off the luminaire device, the air condition device may be turned off automatically to prevent energy waste.

However, it is often that users need to turn off the luminaire device in the area for special need, e.g. using a projector to provide a presentation, or leave the area but turn on the luminaire device, e.g. to provide a light source for a monitor. If the air condition equipment is turned on and turned off simply depending on the working status of the luminaire device, there is high probability of false determination and causes inconvenience to users.

SUMMARY

An objective of the technical solutions is to provide an intelligent control method to automatically determine controlling over air condition devices in an area according to multiple sensed data in the area.

To achieve the aforementioned objective, the intelligent control method is mainly applied to an intelligent control system having an intelligent control device and an air condition device. In this solution, the intelligent control device continuously records $CO_2$ amount values in an area after the air condition device is started, and calculates a $CO_2$ reference value according to the recorded $CO_2$ amount values after detecting that a luminaire device in the area is turned off. The intelligent control device continuously records $CO_2$ amount values continuously in a next time segment and calculates a $CO_2$ compared value after the next time segment is completed. Finally, the intelligent control device determines whether the $CO_2$ amount value trend in the area is rising or decreasing to further determine whether to maintain current mode of the air condition device, to switch to a cool mode, to switch to a fan mode or to turn off the air condition device.

Advantages of such solution may include that by reference to both turn-on or turn-off mode of a luminaire device in the area and varying trend of $CO_2$ amount value to control an air condition device, false determination probability that occurs in traditional intelligent air condition systems replying only on single sensor to determine whether users appear to turn on or to turn off an air condition device is decreased.

DETAILED DESCRIPTION

A preferred embodiment accompanied with drawings is explained as follows.

Figure 1:
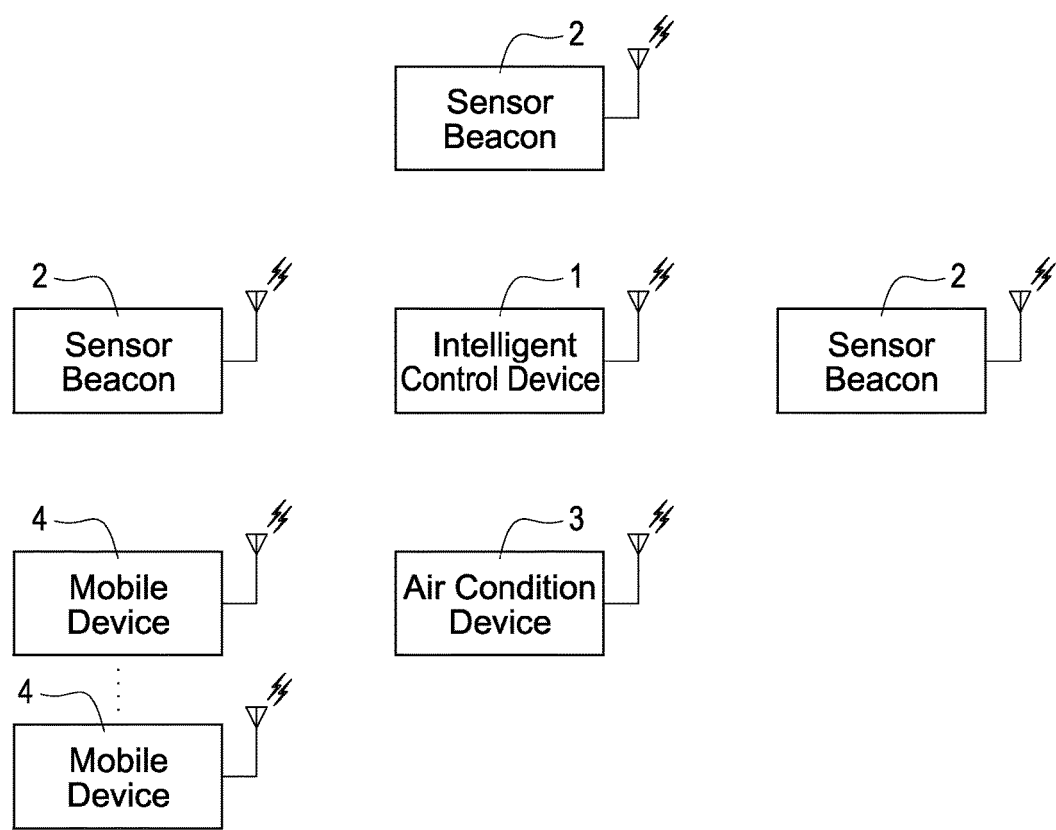
FIG. 1 is an systematic diagram of an intelligent control system according to a first embodiment.

Please refer to FIG. 1, which is an intelligent control system diagram of the first embodiment. The present solution discloses an intelligent control system and an intelligent control method used in the intelligent control system. In this embodiment, the intelligent control system is disposed in an area and includes at least an intelligent control device 1, multiple sensor beacons 2 and an air condition device 3. The intelligent control device 1 is wirelessly connected to the multiple sensor beacons 2 and the air condition device 3.

The multiple sensor beacons 2 are sensor beacons with multiple types of sensors and these sensor beacons are wirelessly connected to the intelligent control device 1 via Bluetooth Low Energy (BLE).

In this embodiment, the intelligent control device 1 may automatically control the air condition device 3 in the area according to the intelligent control method. In other embodiments, the intelligent control system may further include a heat recovery ventilator, an air cleaner or an indoor/outdoor air circulator to be disposed in the same area of the intelligent control device 1 and controlled by the intelligent control device 1. The air condition device 3 is taken as an example in the following for brevity.

Please be noted that the intelligent control device 1 mainly provides control to the air condition device 3 according to various environment parameters in the area. Specifically, the multiple sensor beacons 2 are respectively disposed at different locations of the area to separately sense temperature and humidity values at different locations. Besides, the multiple sensor beacons 2 may be disposed inside or outside the container body (not shown) of the air condition device 3 to respectively sense internal and external pressure values of the container body of the air condition device 3 and sense sound information during operation of the air condition device 3, which is explained further as follows.

The intelligent control device 1 may have multiple sensor units, e.g. a temperature sensor unit for sensing surrounding temperature and humidity of the intelligent control device 1, a $CO_2$ sensor unit for sensing $CO_2$ amount in the area, a PM2.5 sensor unit for sensing PM2.5 particles in the area, a Total Volatile Organic Compound (TVOC) sensor unit like a Charge-Coupled Device (CCD) device for detecting TVOC amount, an image capture unit for sensing users in the area and for performing identity recognition.

As mentioned above, with the multiple sensor beacons 2 and the multiple sensor unit, the intelligent control device 1 may monitor environment in the area and perform corresponding control of the air condition device 3, e.g. to turn on the air condition device, to turn off the air condition device 3 or to switch an operation mode of the air condition device 3.

Figure 2A:
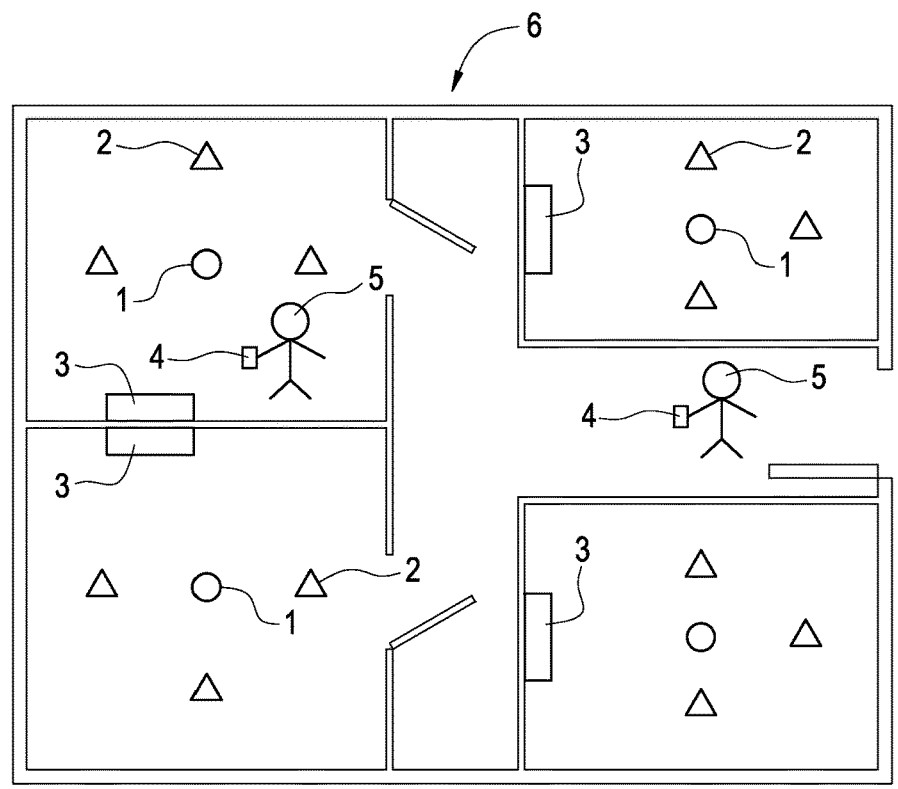
FIG. 2A is an space arrangement diagram for the first embodiment.
Figure 2B:
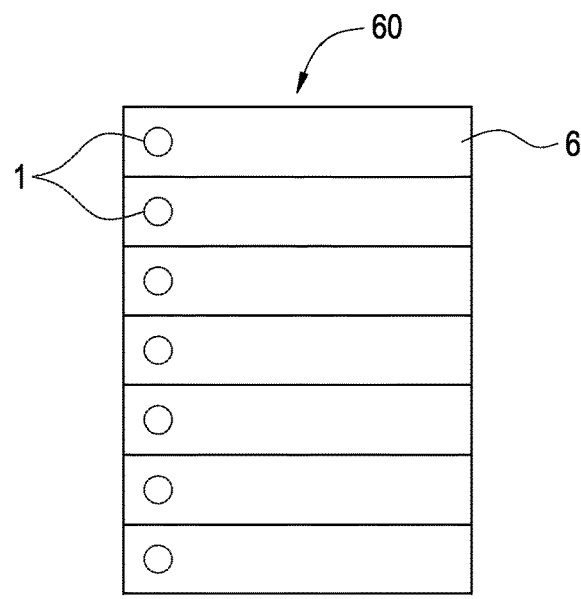
FIG. 2B is a building layout diagram of the first embodiment.

Please refer to FIG. 2A and FIG. 2B, which respectively illustrate spatial layout and building layout diagrams of the first embodiment. In FIG. 2A, the intelligent control system is mainly disposed in an environment space 6 like a floor building layer. Specifically, if the environment space 6 has multiple areas like multiple rooms or multiple office rooms, a set of the intelligent control systems may be disposed in each area.

The intelligent control system may further include one or more mobile devices 4 that are carried by users in the environment space 6. With these mobile devices 4, the intelligent control device 1 may obtain more environment parameters and thus provide a more accurate control on the air condition device.

In FIG. 2B, if a building 60 has multiple floor building layers, i.e. multiple environment spaces 6, a manager may dispose one or multiple sets of the intelligent control systems in each environment space 6. For brevity, in the following disclosure, it is explained as an example in which a set of intelligent control system is used for an area.

In an embodiment, the intelligent control device 1 mainly retrieves turn-on or turn-off information of multiple luminaire devices (not shown) in the area. The intelligent control device automatically turns on the air condition device 3 when the turn-on and turn-off information offset value is larger than a first predetermined value showing that these luminaire devices being turned on. In another embodiment, the intelligent control device 1 may further retrieve $CO_2$ amount in the area with the $CO_2$ sensor unit and automatically turn on the air condition device 3 when the $CO_2$ amount is larger than a second predetermined value showing that one or more users entering the area. However, such setting is only used as an example, instead of limitation for the present invention.

Figure 3:
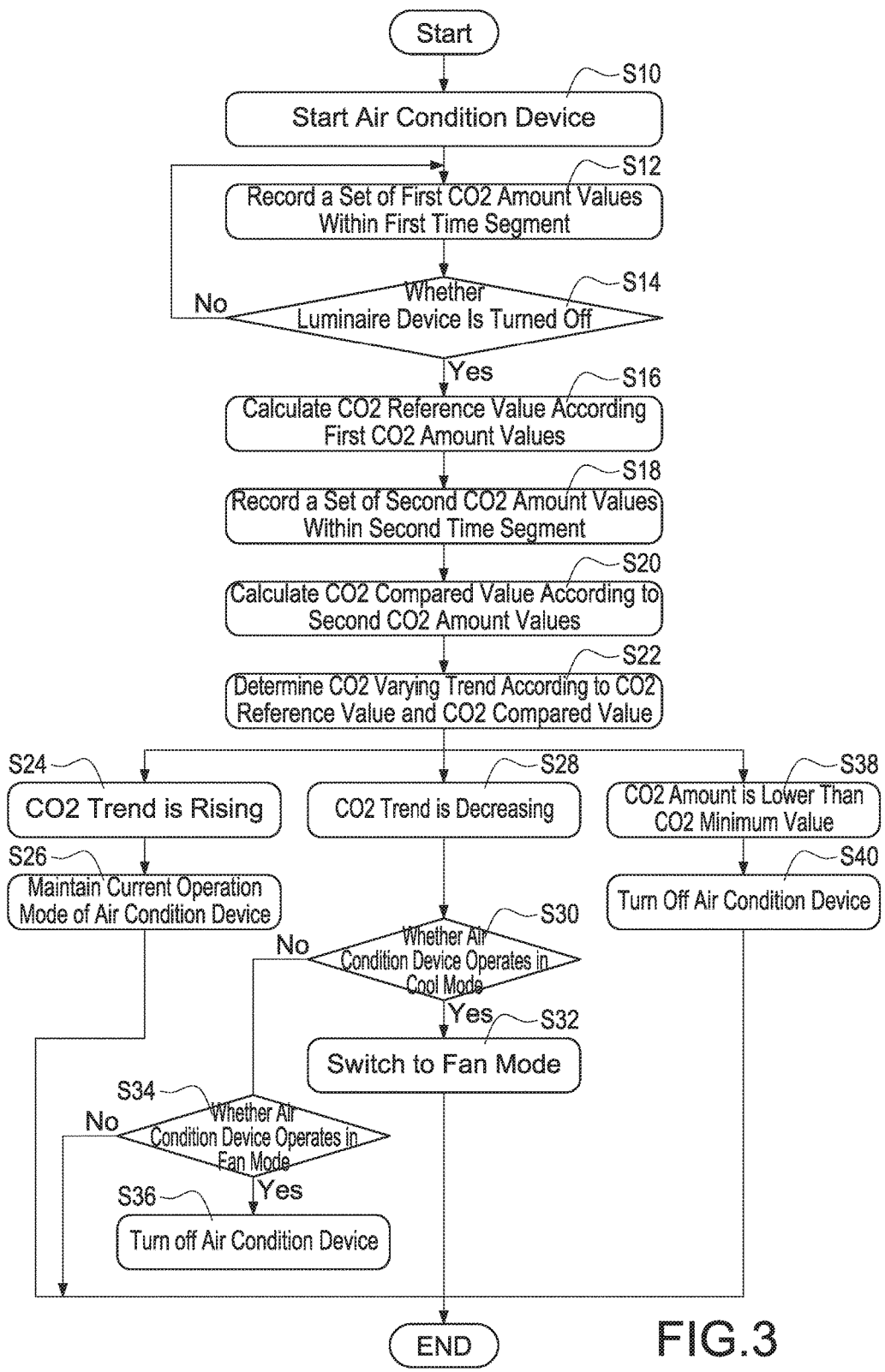
FIG. 3 is a turn-off or turn-off control flow of an air condition device of the first embodiment.

Please refer to FIG. 3, which is a air condition control flowchart of an air condition device according to a first embodiment. In the embodiment of FIG. 3, it is shown how the intelligent control device 1 provide corresponding control to the air condition device 3 according to environment parameters after the air condition device 3 is turned on.

First, the intelligent control device 1 turns on the air condition device 3 (step S10) according to the turn-on and turn-off information or the $CO_2$ amount. After the air condition device 3 is turned on, a set of $CO_2$ amount values is continuously recorded for a first time segment (step S12).

Specifically, the intelligent control device 1 regularly senses $CO_2$ amount, e.g. sensing per 30 seconds, in the area with the $CO_2$ sensor unit and records these data to a data array. If the first time segment is one hour, as an example, after the first time segment is passed, there are 120 entries of $CO_2$ amount values in the data array. After the first time segment is passed, the intelligent control device 1 continuously senses $CO_2$ amount in the area and replaces old data of the data array with new data to keep the data array containing data amount of the first time segment, i.e. the entry number of the first $CO_2$ amount values satisfying the data amount for the first time segment.

After the step S12, the intelligent control device 1 determines whether the luminaire devices are turned off (step S14). Specifically, these luminaire devices are determined whether being turned off depending on the turn-on and turn-off information. If these luminaire devices are not turned off, it is returned to step S12 to continuously sense and update the set of first $CO_2$ amount values.

If these luminaire devices are turned off, the intelligent control device 1 calculates an average value of the set of first $CO_2$ amount values to obtain a $CO_2$ reference value (step S16). Specifically, the $CO_2$ reference value refers to an average value of $CO_2$ amount values in the area in the first time segment before these luminaire devices are turned off.

After the step S16, the intelligent control device 1 starts sensing and recording a set of second $CO_2$ amount values (step S18) in a second time segment in the area with the $CO_2$ sensor unit. The set of second $CO_2$ amount values are recorded in the same manner as the set of first $CO_2$ amount values and thus it is not repeated here.

After the set of second $CO_2$ amount values are recoded, the intelligent control device 1 calculates an average value of the set of second $CO_2$ amount values to retrieve a $CO_2$ compared value (step S20). Specifically, the $CO_2$ compared value refers to an average value of $CO_2$ amount values in the area in the second time segment after these luminaire devices are turned off.

After the step S20, the intelligent control device 1 compare the $CO_2$ reference value to the $CO_2$ compared value to determine a varying trend of $CO_2$ amount in the area after these luminaire devices are turned off. By such, the intelligent control device 1 may depend on the varying trend to determine whether users in the area have left or users not leaving but only some luminaire devices being turned off for providing corresponding control to the air condition device 3.

In an embodiment, if the $CO_2$ amount trend in the area is rising (step S24), the intelligent control device 1 determines that users do not leave the area and the air condition is kept turned on and the air condition device 3 is kept at current operation mode (step S26).

In another embodiment, if the CO2 amount trend in the area is decreasing (step S28), the intelligent control device 1 determines that users have left the area and thus automatically switches the operation mode of the air condition device 3.

Specifically, after the step S28, the intelligent control device 1 further determines whether a current operation mode of the air condition device 3 is a cool mode (step S30). If the air condition device 3 is currently using the cool mode, the intelligent control device 1 controls the air condition device to switch to a fan mode (step S32). If the air condition device 3 is not using the cool mode, the intelligent control device 1 further determines whether the air condition device 3 is running in the fan mode (step S34). If the air condition device 3 is using the fan mode, the intelligent control device 1 turns off the air condition device 3 (step S36).

In another embodiment, the intelligent control device 1 records a CO2 minimum value in the area. The CO2 minimum value may be set when the intelligent control device 1 is manufactured, set by a manager, or calculated by long term sensing and recorded values of the intelligent control device 1. Other configuration settings may be adopted and it is not limited to these examples for the invention scope. In this embodiment, if the intelligent control device 1 determines that the CO2 amount in the area is lower than the CO2 minimum value (step S38), no matter which operation mode is currently used by the air condition device 3, the intelligent control device 1 turns off the air condition device 3 directly (step S40).

Figure 4A:
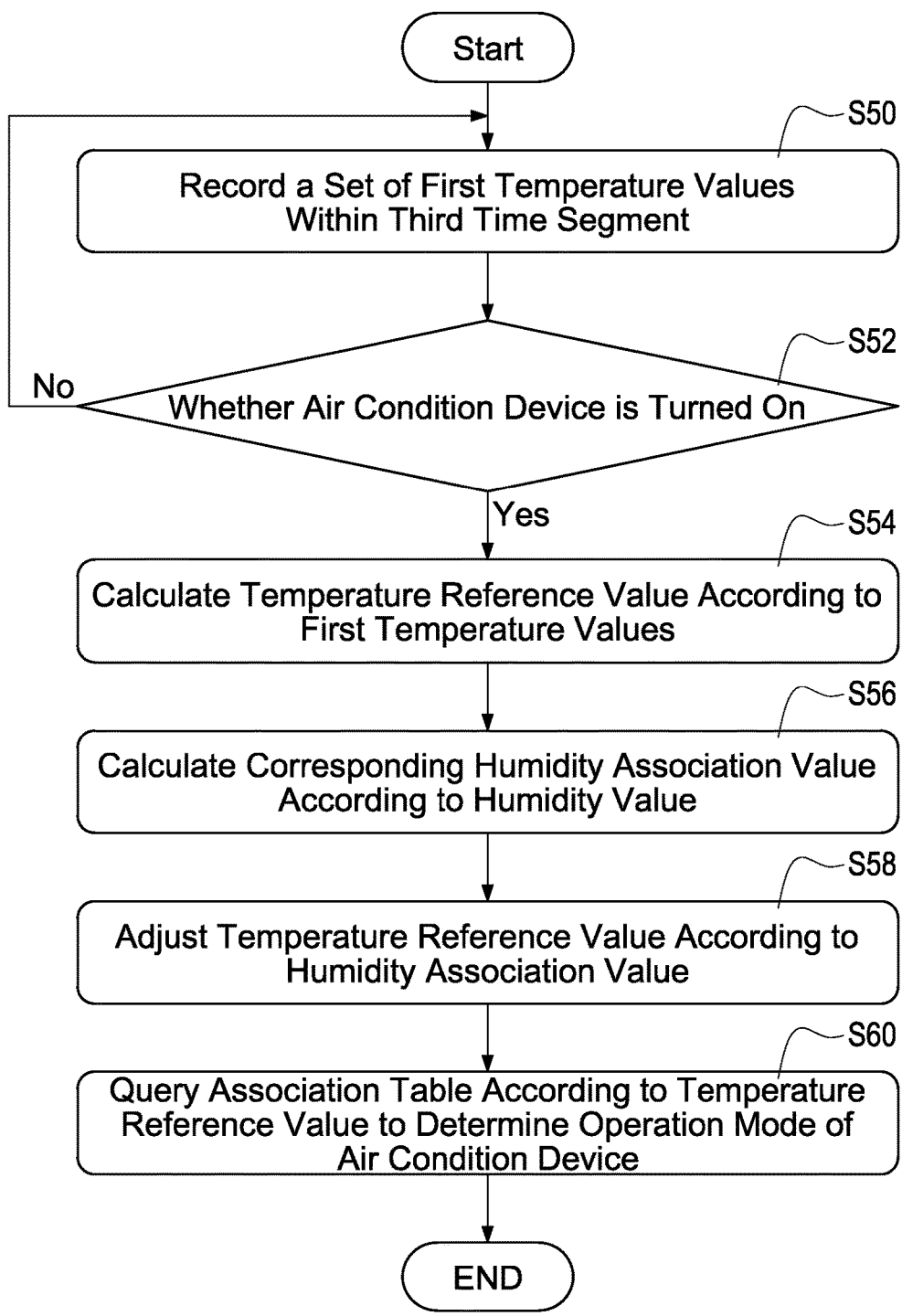
FIG. 4A is a switch flowchart of an air condition device of the first embodiment.

Please refer to FIG. 4A, which is a air condition device mode switch flowchart of the first embodiment. FIG. 4A illustrates an embodiment showing how the intelligent control device 1 selects a most fit operation mode for the air condition device 3 when the air condition device 3 is just started.

Before the air condition device 3 is not started, the intelligent control device 1 continuously senses and records a set of first temperature values (step S50) in a third time segments in the area. Specifically, the intelligent control device 1 regularly senses temperature data in the area with the multiple sensor beacons 2 or the temperature sensor unit and record these data to the data array. In this embodiment, the set of first temperature values include sufficient multiple temperature data corresponding to data amount necessary for the third time segment. The recording method for the set of third time segment is similar for recording the set of first time segment and thus it is not repeated here.

When the intelligent control device 1 senses and records the set of first temperature values, it is continuously determined whether the air condition device 3 is started (step S52). The air condition device 3 may be started by the control of the intelligent control device 1 or manually started by a user. Before the air condition device 3 is started, the intelligent control device 1 repeatedly performs the step S50 to update the set of first temperature values.

After the air condition device 3 is turned on, the intelligent control device 1 calculates an average value of the set of first temperature values to obtain a temperature reference value (step S54). In this embodiment, the intelligent control device 1 relies on the temperature reference value to determine the first operation mode to be used by the air condition device 3 after the air condition device 3 is started.

Please be noted that the humidity of the area affect feeling of users. For example, for high humidity, users may feel less than actual temperature and for low humidity, users may feel higher than actual temperature. As such, the intelligent control device 1 may selectively sense humidity value in the area via the multiple sensor beacons 2 or the temperature sensor unit to fine adjust the temperature reference value based on the sensed humidity value. For example, if the humidity value is larger than 60%, the temperature reference value is adjusted 2° C. higher and if the humidity value is smaller than 20%, the temperature reference value is adjusted 2° C. lower.

Specifically, the intelligent control device 1 firstly senses the humidity value in the area and calculates a humidity associated value (step S56). The intelligent control device 1 then adjusts the temperature reference value (step S58) according to the humidity associated value. Finally, the intelligent control device 1 queries a mode association table according to adjusted temperature reference value to determine an operation mode after the air condition device 3 is started (step S60).

In this embodiment, the mode association table may be downloaded from a cloud server (not shown) to the intelligent control device 1. The mode association table records a corresponding relation between the temperature reference value and multiple operation modes of the air condition device 3. The corresponding relation may be obtained based on history data, user habit and/or weather information gathered by a weather bureau. However, other methods may still be adopted.

For example, the mode association table may record that when the temperature reference value is larger than 25° C., the air condition device 3 is operated in the cool mode, when the temperature reference value is smaller than 16° C., the air condition device 3 is operated in a heating mode, and when temperature reference value is between 16° C. and 25° C., the air condition device 3 is operated in the fan mode. However, this is just an example, not to limit the invention scope.

Figure 4B:
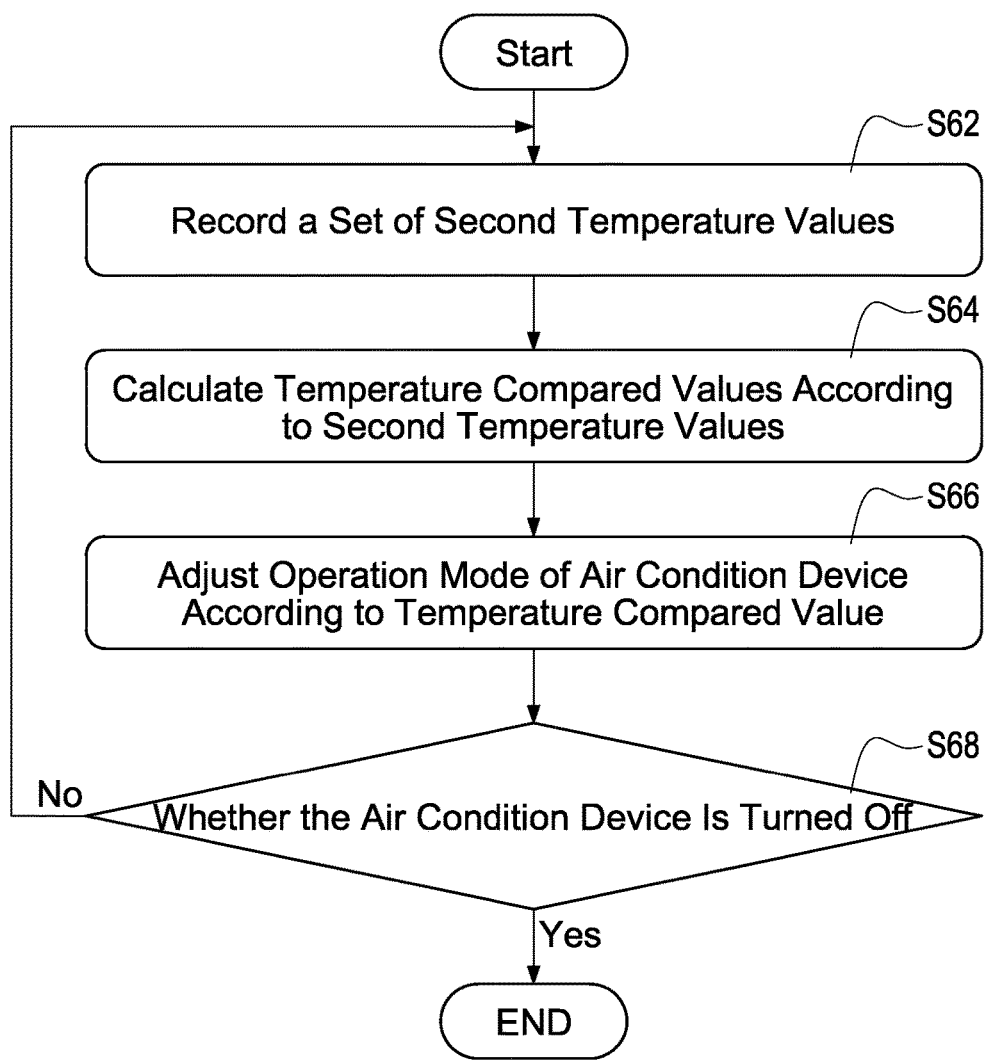
FIG. 4B is a air condition device mode switching flowchart of a second embodiment.

Please refer to FIG. 4B, which illustrate operation mode switching flowchart of the air condition device according to a second embodiment. In FIG. 4B, it is shown how the intelligent control device 1 dynamically switches the operation mode of the air condition device 3 after the air condition device 3 is started.

After the air condition device 3 is started, the intelligent control device 1 senses and records a set of second temperature values (step S62) in the area in the fourth time segment. In this embodiment, the set of second temperature values contain sufficient temperature records satisfying necessary data amount for the fourth time segment. In addition, the set of second temperature values are recorded similar to the set of first temperature values and it is not repeated here again.

When the fourth time segment is passed, the intelligent control device 1 calculates an average value of the set of second temperature values to obtain a temperature compared value (step S64). In this embodiment, the temperature compared value refers to an average temperature in the area for the fourth time segment. Next, the intelligent control device 1 adjusts the operation mode of the air condition device 3 according to the temperature compared value (step S66).

After the step S66, the intelligent control device 1 determines whether the air condition device 3 is turned off (step S68). The intelligent control device 1 repeats the steps S62 to S66 before the air condition device 3 is turned off to continuously sense average temperature in the area and dynamically adjusts the operation mode of the air condition device 3 according to the average temperature.

Specifically, the intelligent control device 1 compare the temperature compared value with a predetermined temperature to determine whether the average temperature in the area is too hot, fine or too cold and further switches the operation mode of the air condition device 3 accordingly. For example, if the temperature compared value is larger than the predetermined temperature, the air condition device 3 is switched to the cool mode, and if the temperature compared value is smaller than the predetermined temperature, the air condition device 3 is switched to the fan mode. However, please be noted that these examples do not limit the invention scope.

In this embodiment, the predetermined temperature may be set by the intelligent control device 1 in advance, manually set by a manager or dynamically set by the intelligent control device 1 according to environment temperature in the area. These examples do not limit the invention scope.

Figure 5A:
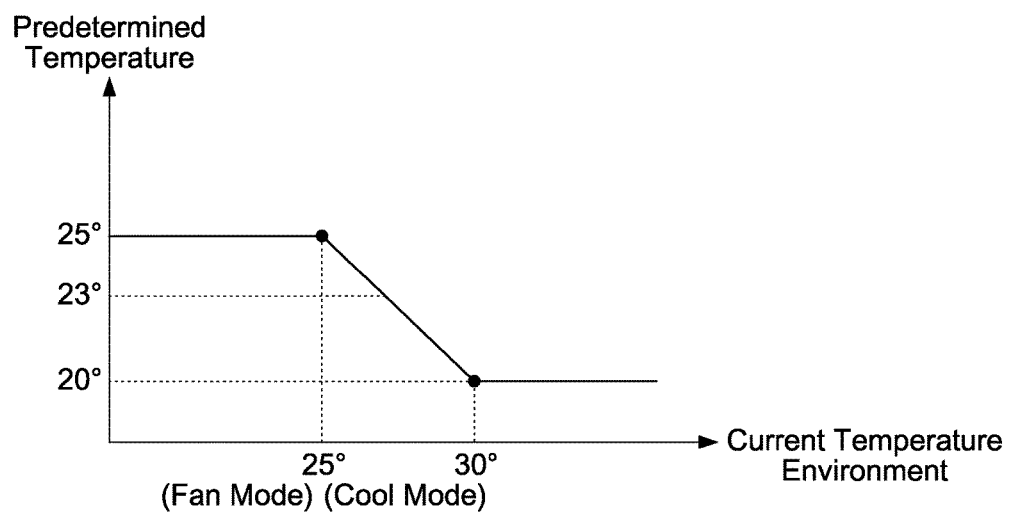
FIG. 5A is a temperature setting diagram of the first embodiment.
Figure 5B:
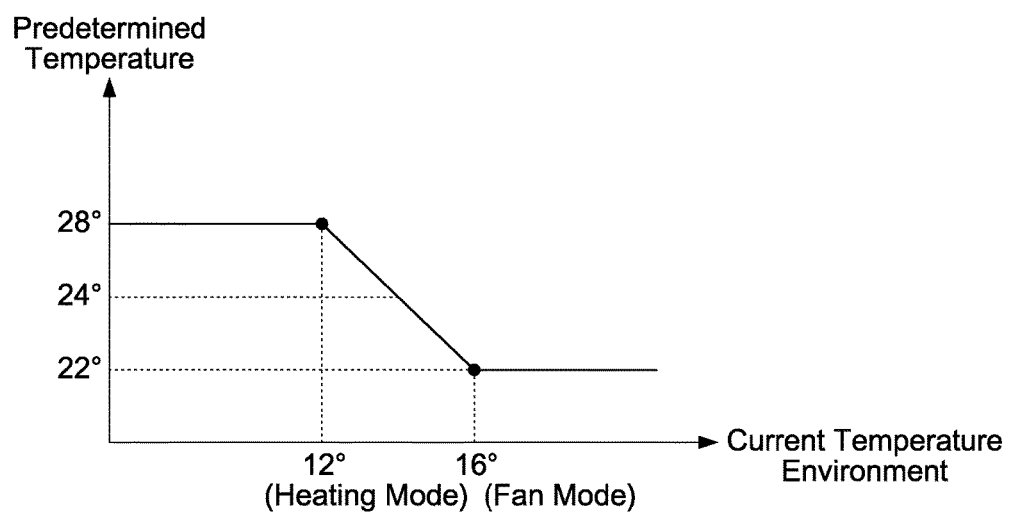
FIG. 5B is a temperature setting diagram of a second embodiment.

Please refer to FIG. 5A and FIG. 5B, which illustrate predetermined temperature setting of the first embodiment and the second embodiment. As mentioned above, the predetermined temperature may not be a fixed value but dynamically set by the intelligent control device 1 according to environment temperature in the area. The embodiments in FIG. 5A and FIG. 5B respectively how the intelligent control device 1 dynamically set the predetermined temperature.

In FIG. 5A, the intelligent control device 1 may set a upper temperature, e.g. 30° C. and a conversion temperature, e.g. 25° C. When the environment temperature is larger than the upper temperature, the predetermined temperature is set as a minimum value, 20° C. in this example, and the air condition device 3 is switched to the cool mode. By such, rapid cooling technical effect is achieved.

When the environment temperature is decreased and falling between the upper temperature and the first conversion temperature, e.g. between 25° C. and 20° C., the predetermined temperature is adjusted. In other words, the predetermined temperature is increased when the environment temperature is decreased. As such, the air condition device 3 is still operated in the cool mode.

When the area environment temperature is smaller than the first conversion temperature, the predetermined temperature is kept at a fixed temperature, e.g. 25° C. in this example, and when the area environment temperature is smaller than the first conversion temperature which means the area is in comfortable zone, the predetermined temperature is not changed following the environment temperature. In such case, the air condition device 3 is switched to the fan mode.

In FIG. 5B, the intelligent control device 1 may set a second conversion temperature, e.g. 16° C., and a bottom temperature, e.g. 12° C. When the area environment temperature is larger than the second conversion temperature, the predetermined temperature is set as a standard value, 22° C. in this example, and the air condition device 3 is operated in the fan mode.

When the area environment temperature is fallen within the second conversion temperature and the bottom temperature, the predetermined temperature is adjusted, 22° C. to 28° C. in this example. In other words, the predetermined temperature is increased when the area environment temperature is decreased. In such case, the air condition device 3 is switched to the heating mode.

When the area environment temperature is smaller than the bottom temperature, 12° C. in this example, the predetermined temperature is kept at a fixed temperature, 28° C. in this example. In addition, when the area environment temperature is smaller than the bottom temperature, the predetermined temperature is not changed following the environment temperature. In such case, the air condition 3 is kept operating in the heating mode.

As mentioned above, the intelligent control device may keep adjusting the air condition device continuously according to the area environment temperature to achieve a comfortable environment for users via the set of second temperature values sensing records and adjustment of predetermined temperature.

Figure 6:
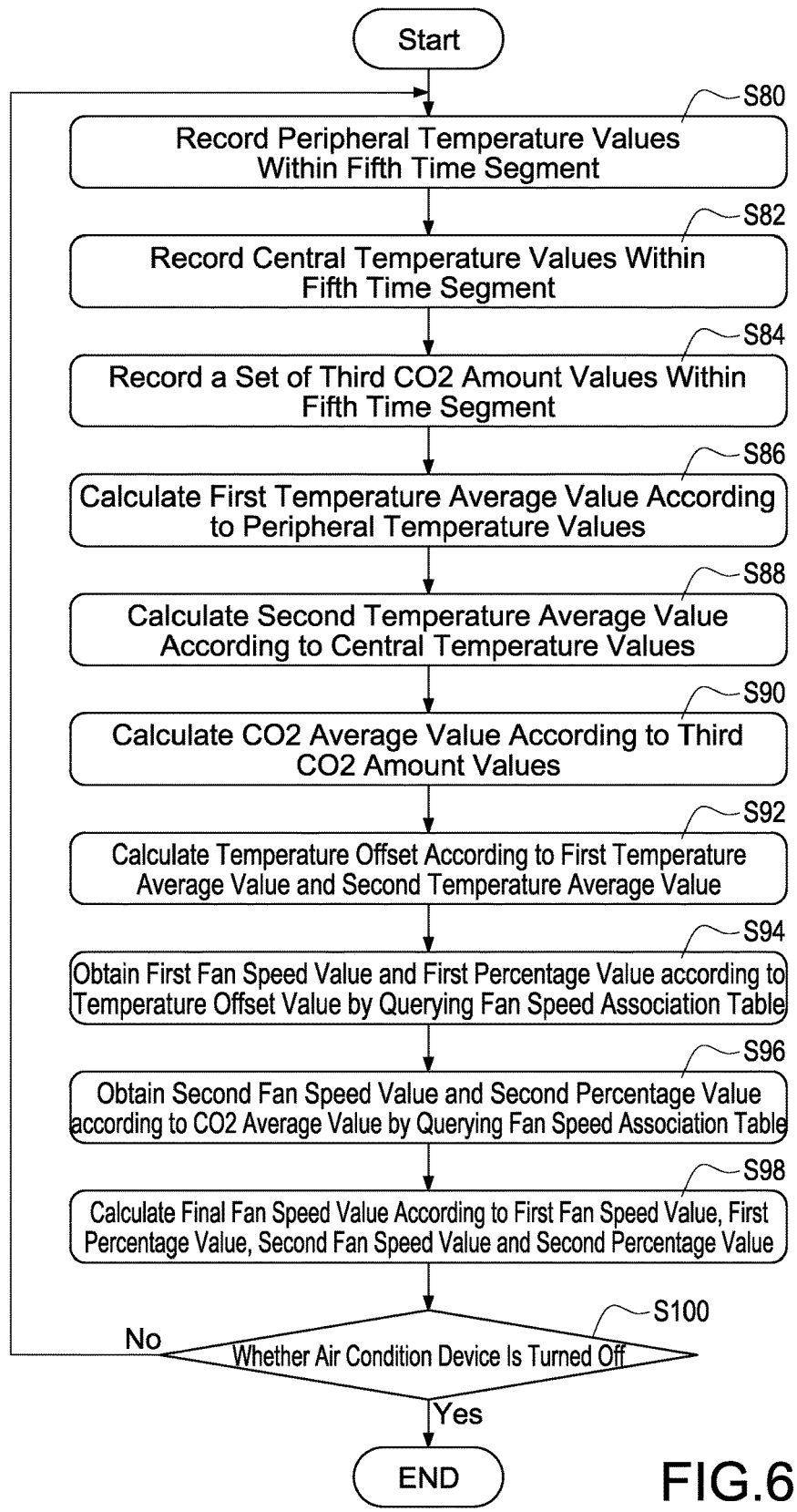
FIG. 6 is an air speed adjustment flowchart of the first embodiment.

Please refer to FIG. 6, which is a fan speed adjustment flowchart of the first embodiment. The embodiment of FIG. 6 relates to how the intelligent control device 1 adjusts fan speed of the air condition device 3 dynamically after the air condition device 3 is started according to area environment parameters.

Firstly, the intelligent control device 1 senses and records a set of peripheral temperature values in the area for a fifth time segment with the multiple sensor beacons 2. In this embodiment, the multiple sensor beacons 2 are respectively disposed in peripheral sections of the area, and thus the sensed temperature data correspond to peripheral temperature status of the area. In addition, the set of peripheral temperature values contain sufficient multiple temperature records satisfying the record amount for the fifth time segment. The recording method for the set of peripheral temperature values is similar to the set of first temperature values and the set of second temperature values and thus it is not repeated here again.

The intelligent control device 1 further senses and records a set of central temperature values (step S82) in the area for the fifth time segment with the temperature sensor unit. In this embodiment, the intelligent control device 1 is mainly disposed at center position of the area, e.g. on a conference room table, and thus the sensed temperature data correspond to temperature status in the center section of the area. In addition, the set of central temperature values contain sufficient multiple temperature records satisfying the record amount for the fifth time segment. The recording method for the set of central temperature values is similar to the set of first temperature values and the set of second temperature values and thus it is not repeated here again.

The smart control device 1 further senses and records a set of third $CO_2$ amount values in the area for the fifth time segment (step S84) with the $CO_2$ sensor unit. In addition, the set of third $CO_2$ amount values contain sufficient $CO_2$ records satisfying the record amount for the fifth time segment. The recording method for the set of $CO_2$ values is similar to the set of second $CO_2$ values and thus it is not repeated here again.

Please be noted that the step S80, the step S82 and the step S84 may be performed concurrently and use the same fifth time segment.

After the fifth time segment, e.g. 3 minutes or 5 minutes, is passed, the intelligent control device 1 calculates the average value of the set of peripheral temperature values to obtain a first temperature average value (step S86), calculates the average value of set of the central temperature values to obtain a second temperature average value (step S88), and calculates the average value of the set of third $CO_2$ amount values to obtain a $CO_2$ average value (step S90). The steps S86, S88 and S90 may be performed in parallel and may not have order sequence relation among each other.

After the first temperature average value, the second temperature average value and the $CO_2$ average value are calculated, the intelligent control device 1 calculates a temperature offset (step S92) in the area according to the first temperature average value and the second temperature average value. Specifically, the first temperature average value represents an average temperature in peripheral sections of the area for a passing time period, i.e. the fifth time segment, and the second temperature average value represents an average temperature in the central section of the area for the passing time period. Thus, a temperature offset between peripheral sections and central section of the area for the passing time period by minus the first temperature average value with the second temperature average value.

After the step S92, the intelligent control device 1 obtains a first fan speed value and a first percentage value (step S94) by querying a fan speed association table according to the temperature offset value. Meanwhile, the intelligent control device 1 further queries the fan speed association table according to the CO2 average value to obtain a second fan speed value and a second percentage value (step S96). The step S94 and the step S95 may be performed concurrently and may not have order sequence relation to each other.

Finally, the intelligent control device 1 calculates a final fan speed value (step S98) for controlling the air condition device 3 according to the first fan speed value, the first percentage value, the second fan speed value and the second percentage value. The intelligent control device 1 then determines whether the air condition device 3 is turned off (step S100) and repeats the step S80 to S98 before the air condition device 3 is turned off to continuously sense the temperature offset and CO2 amount in the area and to dynamically adjust the fan speed of the air condition device 3 to solve problems of large temperature offset or high CO2 amount.

Please be noted that the aforementioned fan speed association table may be stared in the intelligent control device 1 in advance or downloaded from a cloud server to the intelligent control device 1. In this embodiment, the fan speed association table records relation among the temperature offset, the first fan speed value, and the first percentage value and relation among the CO2 average value, the second fan speed value and the second percentage value.

An example of such fan speed association table is illustrated as follows:

| Fan Speed Association Table | | | | | |
|---|---|---|---|---|---|
| temperature offset | first fan speed value | first percentage value | CO2 average value | second fan speed value | second percentage value |
| 1° C. | 20% | 40% | >600 ppm | 20% | 40% |
| 2° C. | 50% | 60% | >800 ppm | 40% | 60% |
| More than 3° C. | 100% | 80% | >1000 ppm | 80% | 80% |
| | | | >1500 ppm | 100% | 100% |

In the table, if the intelligent control device 1 determines the current temperature offset is 2° C., and the CO2 average value is larger than 1000 ppm, the query to the fan speed association table enables the intelligent control device 1 to obtain the final fan speed value as (50%*0.6)+(80%*0.8) =94%. In other words, the intelligent control device 1 generates a corresponding control command according to the final fan speed value and uses the control command to adjust the air condition device 3 for its fan speed. In this example, the air condition device 3 receives the control command and adjusts its fan speed to 94%.

Please be noted that if the intelligent control device 1 calculates a final fan speed value larger than 100%, the air condition device 3 still keeps its fan speed at 100%.

Figure 7:
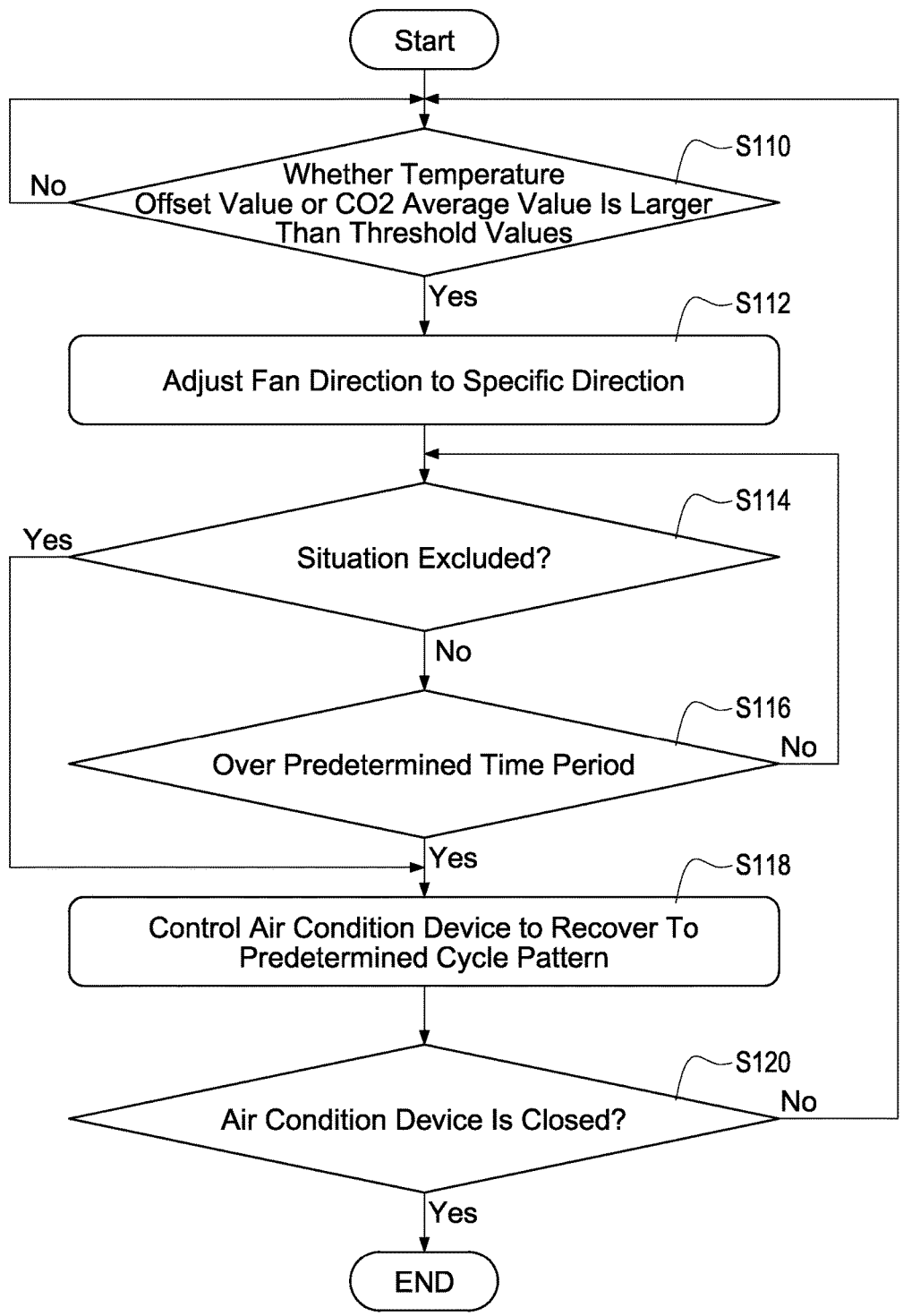
FIG. 7 is a direction adjustment flowchart of the first embodiment.

Please refer to FIG. 7, which illustrates a direction adjustment flowchart of the first embodiment. The embodiment of FIG. 7 shows how an intelligent control device 1 dynamically adjusts the fan direction of the air condition device 3, i.e. the fan swift direction, according to environment parameters of the area after the air condition device 3 is started.

During the air condition device 3 is operated, it mainly adjusts its fan direction according to a predetermined cycling pattern. When the intelligent control device 1 calculates the temperature offset value and the CO2 average value according to the technical solution of FIG. 6, the intelligent control device 1 may further determines whether the temperature offset value or the CO2 average value is larger than a threshold value (step S110). If the temperature offset value or the CO2 average value is larger than the threshold, the intelligent control device 1 adjusts the fan direction of the air condition device 3 to make its fan direction facing to a specific direction (step S112).

For example, if the temperature offset value is larger than the threshold value and the first temperature average value is larger than the second temperature average value, it means that the peripheral temperature is larger than the central temperature. In such case, the intelligent control device 1 instructs the air condition device 3 to adjust its fan direction towards peripheral sections of the area, i.e. where the multiple sensor beacons 2 are disposed to decrease the temperature offset value.

In another example, if the CO2 average value is larger than the threshold value, it means that there are many users in the area and these users are gathered around the intelligent control device 1 and thus the CO2 amount around the intelligent control device 1 does not lower down. In such case, the intelligent control device 1 may instruct the air condition device 3 to adjust its fan direction to the central section of the area, i.e. where the intelligent control device 1 is disposed, to make the CO2 in the central section of the area may evenly moved to other places in the area to decrease the CO2 average value.

In another example, the intelligent control device 1 may record the positions of the multiple sensor beacons 2 in advance, and respectively compares the temperature data of the temperature sensor unit and temperature data of each sensor beacon 2. When a specific sensor beacon 2 reports a over high sensed temperature and temperature offset between the sensed temperature of the specific sensor beacon 2 and the sensed temperature of the temperature sensor unit is larger than a threshold value, the intelligent control device 1 may instruct the air condition device 3 to adjust its fan direction to the position where the specific sensor beacon 2 is disposed so that to decrease the temperature offset between the disposed position and other positions.

After the step S112, the intelligent control device 1 determines whether the situation is excluded, i.e. the case that the temperature offset is too large or the CO2 average value is too large (step S114). If the answer is no, the intelligent control device 1 further determines whether a predetermined time period is passed (step S116), and continuously determines whether the situation is excluded before the predetermined time period is passed.

If the temperature offset value or the CO2 average value is decreased or the predetermined time period is passed but the situation is still not excluded, the intelligent control device 1 controls the fan direction of the air condition device 3 to recover the fan direction to the predetermined cycle pattern (step S118). In addition, the intelligent control device 1 determines whether the air condition device 3 is turned off, and repeats the step S110 to the step S118 before the air condition device 3 is turned off and continuously adjust the fan direction of the air condition device 3.

Please be noted that if the air condition device 3 is adjusted for its fan direction but the situation is still not excluded after the predetermined time period, the intelligent control device 1 concludes it is a special case, e.g. the specific direction is a window or a position for disposing a heating equipment. Therefore, after the predetermined time period, no matter whether the situation is excluded, the intelligent control device 1 recovers the air condition device 3 to the predetermined cycle pattern.

In addition, as mentioned above, the intelligent control device 1 may further include a PM2.5 sensor unit and a TVOC sensor unit. In this example, the intelligent control device 1 may directly control the air condition device 3 to adjust its fan direction toward the position where the intelligent control device 1 is disposed, i.e. the central position of the area, when the PM2.5 or TVOC amount is too high or over a dangerous value. After the PM2.5 or TVOC amount in the central position of the area is decreased, the air condition device 3 is recovered to its original cycle pattern. By such, it prevents danger when too many users area gather around the intelligent control device 1.

Please be noted that the intelligent control device 1, as mentioned above, may also have an image capture unit (not shown). In an example, the intelligent control device 1 may capture biological feature of a person and performs identity recognition with the image capture unit to determine whether there is a person entering the area. As such, the intelligent control device 1 may determine a person entering the area and control the air condition device 3 to turn on.

Specifically, it cannot solve the problem when users forget to turn off luminaire devices if simply relying on checking turn-on and turn-off information of the luminaire devices to control the air condition device 3. If simply relying on CO2 amount to control the air condition device 3, it is not able to determine whether there is actually a person in the area, e.g. a pet may also change CO2 amount in the area. Therefore, by accompanying use of the image capture unit, the intelligent control device 1 may provide a more accurate control.

In this embodiment, the intelligent control device 1 may further upload the biological feature of a person to a cloud server to perform identity recognition of the person. As such, the intelligent control device 1 may recognize the identity of the person. As such, if there are multiple intelligent control devices 1 disposed in the building 60 and these intelligent control devices 1 are equipped with the image capture unit, a manager may know positions of all people via the cloud server.

Figure 8:
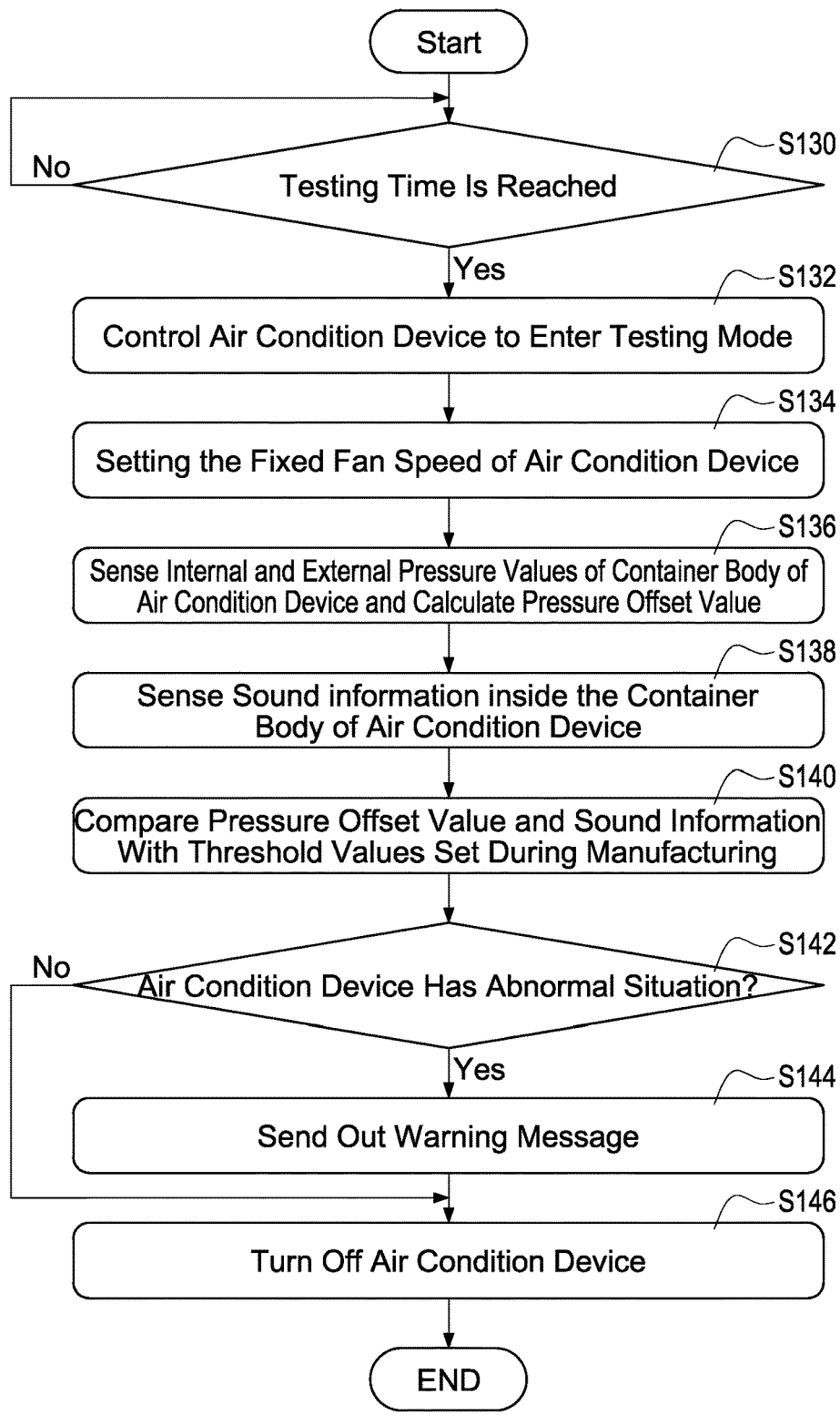
FIG. 8 is an air condition device testing flowchart of the first embodiment.

Please refer to FIG. 8, which is a testing flowchart for the air condition device of the first embodiment. In this embodiment, the multiple sensor beacons 2 include a pressure sensor for sensing pressure values and a sound sensor for sensing sound information. FIG. 8 illustrates a technical solution in which multiple sensor beacons 2 are disposed inside the container body of the air condition device 3 to sense the pressure value and sound information to test whether the air condition is damaged.

Firstly, the intelligent control device 1 may automatically set or manually set by a manager for a testing period, e.g. 12 am midnight. In this example, the testing time means no user uses the air condition device 3.

The intelligent control device 1 continuously determines whether the testing time period is reached (step S130). If the testing time period is reached, the air condition device 3 is automatically turned on and the air condition device 3 is controlled to enter a testing mode (step S132). In the testing mode, the air condition device 3 is set to run with a fixed fan speed (step S134).

Then, the intelligent control device 1 uses the multiple sensor beacons 2, i.e. the pressure sensors, to respectively sense inner and outer pressure values inside and outside the container body of the air condition device 3 to calculate a pressure offset value (step S136). Meanwhile, the intelligent control device 1 uses the multiple sensor beacons 2, i.e. the sound sensors, to detect sound information inside the container body of the air condition device 3 (step S138). The step S136 and the step S138 may be performed at the same time, and there is no limitation on their sequence order for execution.

Then, the intelligent control device 1 compares the pressure offset value and the sound information with threshold values set during manufacturing (step S140) to determine whether the air condition device 3 is abnormal (step S142). Specifically, the threshold values during manufacturing record pressure values inside the container body and outside the container body and sound information inside the container body running at the fixed fan speed when the air condition device 3 is manufactured. By comparing of step S140, the intelligent control device 1 determines whether the motor of the air condition device 3 is abnormal, blocking in the filter or hardware driving program error.

If abnormal situation is found during the step S142, the intelligent control device 1 sends out a warning message (step S144), e.g. sending a warning message to the cloud server or a mobile device 4 owned by a manager. These examples do not limit the invention scope. At last, after the testing mode is completed, the intelligent control device turns off the air condition device 3 (step S146).

With the embodiment of FIG. 8, the intelligent control device 1 may regularly test the air condition device 3 to save man power and cost for regularly performing maintenance.

Figure 9:
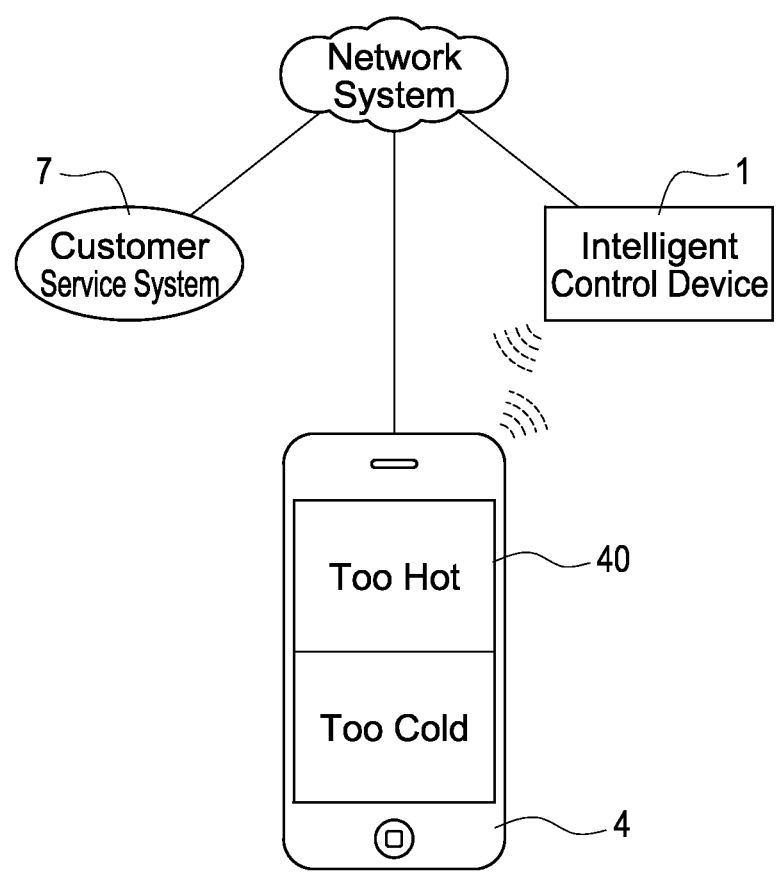
FIG. 9 is an intelligent control system diagram of the second embodiment.

Please refer to FIG. 9, which is an intelligent control system diagram of the second embodiment. FIG. 9 illustrates an embodiment how the mobile device 4 and the intelligent control device 1 to communicate with each other.

The mobile device 4 is carried by a user for detecting user information of the user, e.g. body temperature or heartbeats. Specifically, the mobile device 4 is a smart phone or a smart watch capable of sensing user information. These examples do not limit the invention scope.

In this embodiment, the mobile device 4 is installed with an app (Application Program) 40. The mobile device 4 uses the app 40 to wirelessly connect to the intelligent control device 1 to transmit the user information to the intelligent control device 1. In addition, the mobile device 4 may use the app 40 to provide a motion sensor feedback interface and use the motion sensor feedback interface to receive an input of the user, e.g. too hot or too cold. In addition, the app 40 may transmit the feedback information to the intelligent control device 1.

When the user is located in the area, the intelligent control device 1 may wireless connect to the mobile device 4 and uses the app 40 to receive the user information and the feedback information. As such, the user body condition may be used as one of environment parameters. In a preferred embodiment, the intelligent control device 1 may adjust the third time segment and the fourth time segment for the embodiments of FIG. 4A and FIG. 4B according to the user information and the feedback information. As such, the mode switching time of the air condition device 3 may be adjusted to make the user feel more comfortable.

On the other hand, the mobile device 4 may also connect to a customer service system 7 via a network system. When the user finds the intelligent control system having any problem, the app 40 may be used for sending a query message to the customer service system 7. The query message, for example, may include the number of locations of the intelligent control system and abnormal situations occurred.

A maintenance person may receive the query message from the app 40 via the customer service system 7 and connects to the corresponding intelligent control device 1 via the network system to check and fix the abnormal situation reported by the user. As such, the maintenance person does not need to move to the real place to check the intelligent control system to effectively lower man cost.

Figure 10:
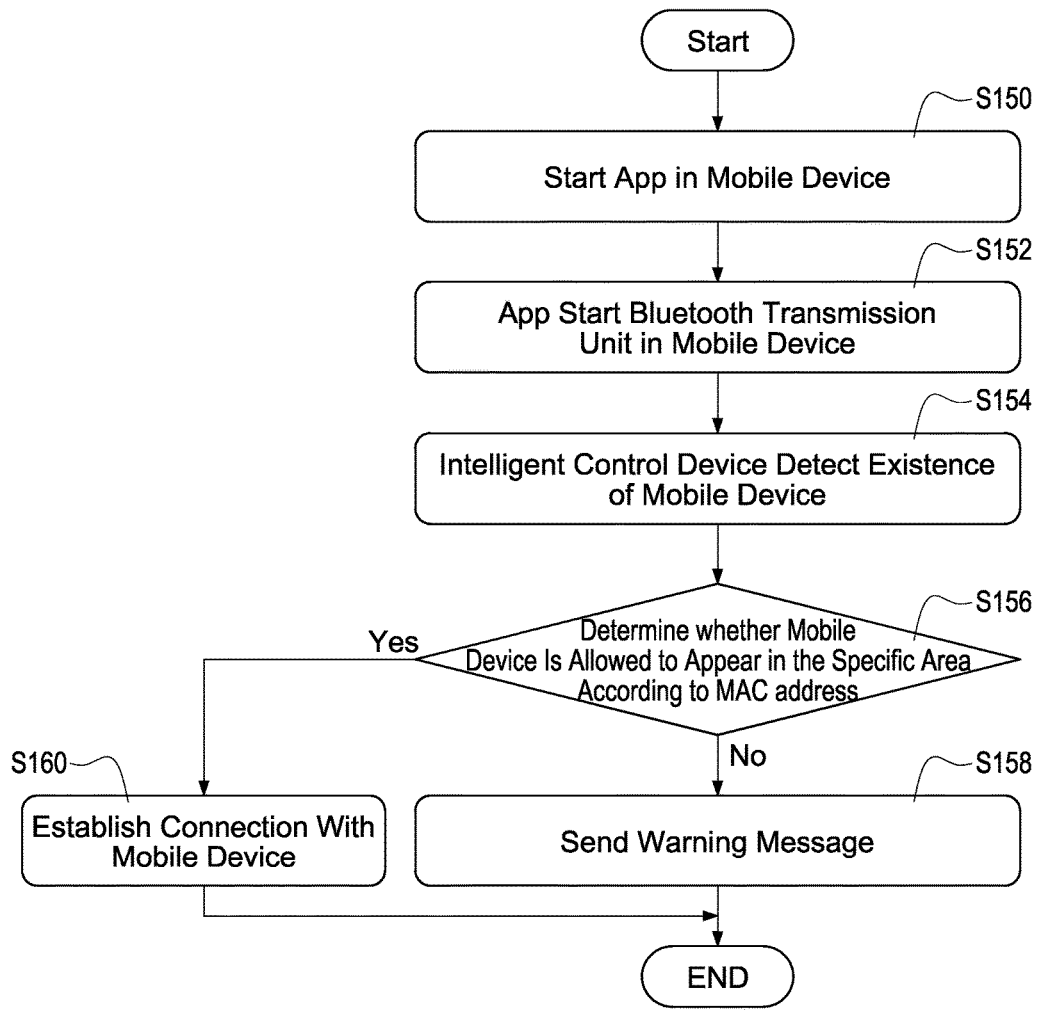
FIG. 10 is a location detection flowchart of the first embodiment.

Please refer to FIG. 10, which illustrate a position detection flowchart of the first embodiment. FIG. 10 illustrates an embodiment how the intelligent control device 1 uses the mobile device 4 to determine the position of the user.

In this example, the mobile device 4 contains a Bluetooth transmission unit support BLE function and the Bluetooth transmission unit has an unique Media Access Control (MAC) address.

When the user tries to connect to the intelligent control device 1 or the customer service system 7, the app 40 is activated on the mobile device (step S150). When the app 40 is activated, it automatically turns on the Bluetooth transmission unit in the mobile device 4 (step S152). Meanwhile, if the mobile device 4 is located in any wireless transmission range of any intelligent control device 1 in the building 60, the intelligent control device 1 detects the existence of the mobile device 4 (step S154) and retrieves the MAC address of the Bluetooth transmission unit of the mobile device 4.

In this example, the intelligent control device 1 is disposed in a specific area, like a factory, a warehouse, or a server room, and records all MAC addresses of Bluetooth transmission units of the mobile devices 4 that are allowed to enter the specific area, i.e. all users allowed to enter the specific area). After the step S154, the intelligent control device 1 determines whether the mobile device 4, i.e. the user, is allowed to appear at the specific area (step S156) according to the retrieved MAC address.

f the intelligent control device 1 determines that the mobile device 4 is not allowed to appear at the specific area, i.e. the intelligent control device 1 does not record the MAC address, the intelligent control device 1 sends out a warning message (step S158), e.g. sending the message to a cloud server or a mobile device 4 of a manager.

On the other hand, if the intelligent control device 1 determines that the mobile device 4 is allowed to appear in the specific area, the intelligent control device 1 establishes a connection to the mobile device 4 via BLE function (step S160). As such, the user uses the mobile device 4 and the app 40 to check information of the intelligent control device 1, the multiple sensor beacons 2 and the air condition device 3.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An intelligent control method of air condition device applied in an intelligent control system disposed in an area and having an air condition device and an intelligent control device, the intelligent control method comprising:
   a) recording a set of first $CO_2$ values in a first time segment after the air condition device being started, wherein a first luminaire device is on in the first time segment;
   b) calculating a $CO_2$ reference value according to the set of first $CO_2$ values when the first luminaire device being turned off;
   c) recording a set of second $CO_2$ values in a second time segment after the first luminaire device being turned off;
   d) calculating a $CO_2$ compared value according to the set of the second $CO_2$ values;
   e) comparing the $CO_2$ reference value and the $CO_2$ compared value to determine a varying trend of $CO_2$ amount in the area;
   f) the intelligent control device maintaining an operation mode currently used by the air condition device when the varying trend of $CO_2$ amount in the area indicating a rising trend; and
   g) the intelligent control device switching the operation mode of the air condition device when the varying trend of $CO_2$ amount in the area indicating a decreasing trend, and comprising:
   g1) determining the operation mode currently used by the air condition device when the vary trend of $CO_2$ amount indicates the decreasing trend;
   g2) switching the operation mode of the air condition device to a fan mode when the $CO_2$ amount is under the decreasing trend and the air condition device is operated in a cool mode; and
   g3) turning off the air condition device when the $CO_2$ amount is under the decreasing trend and the air condition device is operated in the fan mode.

2. The intelligent control method of claim 1, further comprising step h): turning off the air condition device when the $CO_2$ amount in the area is lower than a $CO_2$ minimum value.

3. The intelligent control method of claim 1, wherein the intelligent control system further comprises a plurality of sensor beacons wirelessly connected to the intelligent control device and the intelligent control method further comprises:
   i1) sensing and recording a set of first temperature values of a third time segment with the plurality of sensor beacons in a third time segment before the air condition device is started;
   i2) calculating a temperature reference value according to the set of first temperature values after the air condition device is started;
   i3) fine adjusting the temperature reference value according to a humidity value currently in the area; and
   i4) querying a mode association table according to fine adjusted temperature reference value to determine the operation mode of the air condition device.

4. The intelligent control method of claim 3, wherein the mode association table records a relation between the temperature reference value and the plurality of the operation modes of the air condition device, and in the step i4), the air condition device is controlled to adopt the cool mode when the temperature reference value is higher than 25° C., the air condition device is controlled to adopt a heating mode when the temperature reference value is lower than 16° C., and the air condition device is controlled to adopt the fan mode when the temperature reference value is between 16° C. and 25° C.

5. The intelligent control method of claim 3, further comprising:
  i5) sensing and recording a set of second temperature values in a fourth time segment via the plurality of sensor beacons after the step i4);
  i6) calculating a temperature compared value according to the set of second temperature values;
  i7) switching the operation mode of the air condition device to the cool mode when the temperature compared value being larger than a predetermined temperature;
  i8) switching the operation mode of the air condition device to the fan mode when the temperature compared value is smaller than the predetermined temperature; and
  i9) repeating the step i5 to step i8 before the air condition device is turned off.

6. The intelligent control method of claim 5, wherein the intelligent control system further comprises a mobile device wirelessly connected to the intelligent control device for sensing user information and receiving feedback information, and the intelligent control device adjusts the time lengths of the third time segment and the fourth time segment according to the user information and the feedback information.

7. The intelligent control method of claim 6, wherein the mobile device is a smart phone or a smart watch capable of sensing the user information, and the user information at least contains temperatures and heartbeats of a user.

8. The intelligent control method of claim 6, wherein the mobile device is installed an app for providing a motion sensing feedback interface for receiving the user to input the feedback information and for transmitting the user information and the feedback information to the intelligent control device.

9. The intelligent control method of claim 1, wherein the intelligent control system further comprises a mobile device, the mobile device is installed with an app for wirelessly connecting to the intelligent control device, a Bluetooth transmission unit of the mobile device is automatically started when the app is started, and the intelligent control method further comprises:
  j1) determining whether the mobile device being allowed to appear in the area according to Media Access Control (MAC) address of the mobile device when the intelligent control device detecting the mobile device;
  j2) the intelligent control device establishing a connection to the mobile device via BLE function if the mobile device being allowed to appear in the area; and
  j3) the intelligent control device sending out a warning message when the mobile device being not allowed to appear in the area.

10. The intelligent control method of claim 1, wherein the intelligent control system further comprises a plurality of sensor beacons wirelessly connected to the intelligent control device, and the intelligent control method further comprises:
  k1) starting the air condition device when the air condition device being turned off and a testing time period being reached;
  k2) controlling the air condition device to a testing mode and setting a fixed fan speed;
  k3) separately sensing inner and outer pressure values of the air condition device with the plurality of sensor beacons and calculating a fan pressure offset value;
  k4) sensing sound information inside the container body of the air condition device with the plurality of sensor beacons;
  k5) comparing the fan pressure offset value and the sound information with predetermined threshold values set during manufacturing to determine whether the air condition device is abnormal;
  k6) sending out a warning message when the air condition device being determined abnormal; and
  k7) turning off the air condition device after the testing mode being completed.

11. The intelligent control method of claim 1, wherein the intelligent control device captures biological feature of a person and performs identity recognition with an image capture unit to determine whether there is a person entering the area and the intelligent control device controls the air condition device to start when the user is determined entering the area.

12. The intelligent control method of claim 1, wherein the intelligent control system further comprises a plurality of sensor beacons wirelessly connected to the intelligent control device, the intelligent control device comprises a $CO_2$ sensor unit and a temperature sensor unit, and the intelligent control method further comprises:
  l1) sensing and recording a set of peripheral temperature values in the area with the plurality of sensor beacons within a fifth time segment;
  l2) sensing and recording a central temperature values in the area with the plurality of temperature sensor units within the fifth time segment;
  l3) retrieving and recording a set of third $CO_2$ amount values with the $CO_2$ sensor unit within the fifth time segment;
  l4) separately calculating a first temperature average value, a second temperature average value and a $CO_2$ average value according to the set of peripheral temperature values, the set of central temperature values and the set of third $CO_2$ amount values;
  l5) calculating a temperature offset value according to the first temperature average value and the second temperature average value;
  l6) retrieving a first fan speed value and a first percentage value by querying a fan speed table according to the temperature offset value;
  l7) retrieving a second fan speed value and a second percentage value by querying the fan speed table according to the $CO_2$ average value;
  l8) calculating and controlling the fan speed of the air condition device to a final fan value according to the first fan speed value, the first percentage value, the second fan speed value and the second percentage value; and
  l9) repeating the step l1) to step l8 before the air condition device is turned off.

13. The intelligent control method of claim 12, further comprising:
  m1) adjusting fan direction of the air condition device to a specific direction when the temperature offset value or the $CO_2$ average value being larger than a threshold value; and
  m2) controlling the air condition device to recover back to a predetermined cycling method if the temperature offset value or the $CO_2$ average value being decreased, or being unable to decrease over a predetermined time period.

14. An intelligent control method of air condition device used in an intelligent control system, the intelligent control system being disposed in an area, and having an air condition device and an intelligent control device wirelessly connecting to the air condition, the intelligent control method comprising:
- a) the intelligent control device sensing and recording a set of first CO2 amount values with a CO2 sensor unit, wherein the set of first CO2 amount values comprise a plurality of CO2 amount values in the area within a first time segment;
- b) calculating an average value of the set of first CO2 amount values to obtain a CO2 reference value when a luminaire device in the area being turned off;
- c) the intelligent control device sensing and recording a set of second CO2 amount values with the CO2 sensor unit, wherein the set of second CO2 amount values comprise a plurality of CO2 amount values in the area within a second time segment;
- d) calculating an average value of the set of second CO2 amount values to obtain a CO2 compared value;
- e) determining whether the CO2 amount value in the area being under a rising trend or under a decreasing trend according to the CO2 reference value and the CO2 compared value;
- f) keeping the air condition device active and maintaining an operation mode currently used by the air condition device when the CO2 amount value in the area being under rising trend;
- g) switching the operation mode of the air condition device to a fan mode when the CO2 amount value in the area being under decreasing trend and the air condition device being operated in a cool mode;
- h) turning off the air condition device when the CO2 amount value in the area being under decreasing trend and the air condition device being operated in the fan mode; and
- i) turning off the air condition device when the CO2 amount value in the area being lower than a CO2 minimum value.

15. The intelligent control method of claim 14, wherein the intelligent control system further comprises a plurality of sensor beacons wirelessly connected to the intelligent control device, and the intelligent control method further comprising:
- j1) sensing and recording a set of first temperature values with the plurality of sensor beacons, wherein the set of first temperature values comprise a plurality of temperature data in the area within a third time segment before the air condition device is turned on;
- j2) retrieving a temperature reference value by calculating an average value of the set of first temperature values after the air condition device is started;
- j3) calculating a humidity associated value according to a humidity value currently in the area;
- j4) adjusting the temperature reference value according to the humidity associated value;
- j5) controlling the started air condition device to operate with the cool mode after the adjusted temperature reference value being larger than 25° C.;
- j6) controlling the started air condition device to operate with a heating mode after the adjusted temperature reference value being smaller than 25° C.; and
- j7) controlling the started air condition device to operate with the fan mode after the adjusted temperature reference value being between 16° C. and 25° C.

16. The intelligent control method of claim 15, further comprising:
- j8) sensing and recording a set of second temperature values when the air condition device is started and operated in the cool mode, the heating mode or the fan mode, wherein the set of second temperature values are recorded as a plurality of temperature data in the area after the air condition device is started and within a fourth time segment;
- j9) retrieving a temperature compared value by calculating an average value of the set of second temperature values;
- j10) controlling the air condition device to operate in the cool mode when the temperature compared value being larger than a predetermined value;
- j11) controlling the air condition device to operate in the fan mode when the temperature compared value being smaller than the predetermined value; and
- j11) repeating the step j9 to j11 before the air condition device is turned off.

17. The intelligent control method of claim 16, wherein the intelligent control device captures a biological feature of a user and performs identity recognition with an image capture device to determine whether the user enters the area and the intelligent control device starts the air condition device when the intelligent control device determines the user enters the area.

18. The intelligent control method of claim 16, wherein the plurality of sensor beacons comprise a pressure sensor and a sound sensor, and the intelligent control method further comprises:
- l1) starting the air condition device when the air condition device is turned off and reaching a testing time;
- l2) controlling the air condition device to a testing mode;
- l3) setting a fixed fan speed of the air condition device in the testing mode;
- l4) separately sensing inner and outer pressure values of the container body of the air condition device with the pressure sensor and calculating a fan speed offset value;
- l5) sensing sound information inside the container body of the air condition device with the sound sensor;
- l6) determining whether the air condition device being abnormal by comparing the fan pressure offset value and the sound information to a predetermined threshold value set during manufacturing;
- l7) sending out a warning message when determining the air condition device being abnormal; and
- l8) turning off the air condition device after the testing mode is ended.

19. The intelligent control method of claim 16, wherein the intelligent control system further comprises a mobile device wirelessly connected to the intelligent control device, the mobile device senses user information of a user and is installed with an app for providing motion sensor feedback interface for receiving the user to input feedback information, the mobile device transmits the user information and the feedback information to the intelligent control device via the app, wherein the user information at least comprises body temperature and heartbeats of the user and the mobile device is a smart phone or a smart watch capable of sensing the user information.

* * * * *